United States Patent
Maltese et al.

(10) Patent No.: US 10,078,903 B2
(45) Date of Patent: Sep. 18, 2018

(54) METHOD FOR DETECTING AND TRACKING TARGETS

(71) Applicant: SAFRAN ELECTRONICS & DEFENSE, Boulogne-Billancourt (FR)

(72) Inventors: Dominique Maltese, Boulogne-Billancourt (FR); Ahmed Hamrouni, Boulogne-Billancourt (FR)

(73) Assignee: SAGEM DEFENSE SECURITE, Boulonge-Billancourt (FR)

( * ) Notice: Subject to any disclaimer, the term of this patent is extended or adjusted under 35 U.S.C. 154(b) by 35 days.

(21) Appl. No.: 15/117,071

(22) PCT Filed: Jan. 22, 2015

(86) PCT No.: PCT/EP2015/051244
§ 371 (c)(1),
(2) Date: Aug. 5, 2016

(87) PCT Pub. No.: WO2015/117833
PCT Pub. Date: Aug. 13, 2015

(65) Prior Publication Data
US 2016/0350938 A1 Dec. 1, 2016

(30) Foreign Application Priority Data
Feb. 7, 2014 (FR) ...................... 14 00355

(51) Int. Cl.
*G06K 9/00* (2006.01)
*G06T 7/20* (2017.01)
*G06T 7/277* (2017.01)

(52) U.S. Cl.
CPC ............... *G06T 7/208* (2013.01); *G06K 9/00* (2013.01); *G06T 7/277* (2017.01);
(Continued)

(58) Field of Classification Search
CPC ... A61B 55/0068; A61B 5/055; A61B 5/4041; A61B 5/4519; A61B 5/7228;
(Continued)

(56) References Cited

U.S. PATENT DOCUMENTS 4,274,609 A * 6/1981 Ferrier ...................... F41G 7/30
244/3.14
4,497,065 A * 1/1985 Tisdale ................... F41G 3/165
244/3.15
(Continued)

FOREIGN PATENT DOCUMENTS

WO 02/21152 A2 3/2002
WO 2011/114086 A1 9/2011

OTHER PUBLICATIONS

International Preliminary Report of Patentability dated Apr. 28, 2016, issued in corresponding International Application No. PCT/EP2015/051244, filed Jan. 22, 2015, 9 pages.
(Continued)

*Primary Examiner* — Aklilu Woldemariam
(74) *Attorney, Agent, or Firm* — Christensen O'Connor Johnson Kindness PLLC

(57) ABSTRACT

The invention relates to a method for detecting and tracking targets in a series of successive images, said method comprising limiting the number of spots which are the subject of simultaneous tracking or false leads. The operation of the tracking module is thereby improved without having to increase a detection threshold of said spots. The detection threshold can even be reduced, such that the detection haul is increased and the tracking of each target is more continuous, without the probability of false alarms itself being increased.

12 Claims, 2 Drawing Sheets

Figure 1:
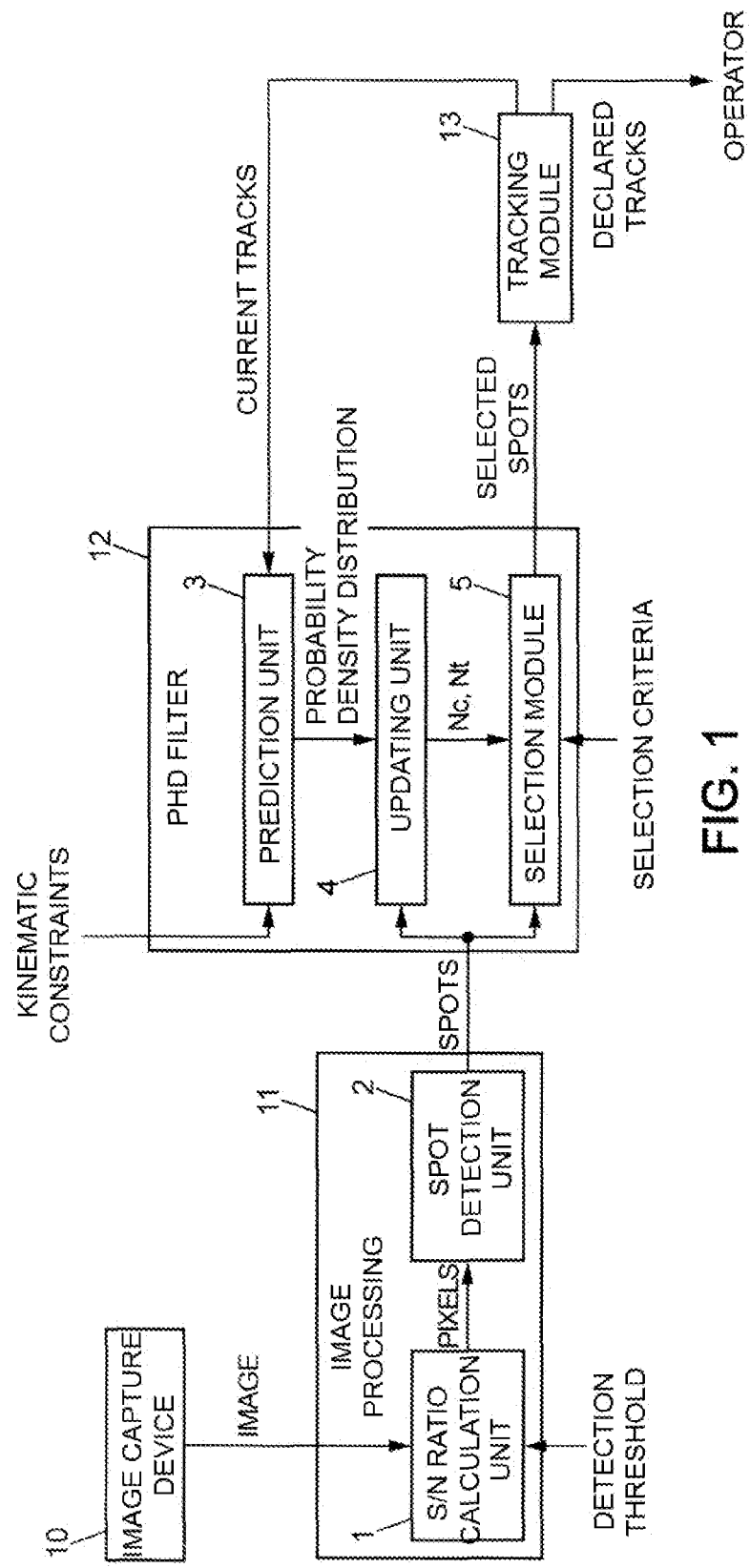

(52) U.S. Cl.
CPC .............. *G06T 2207/10016* (2013.01); *G06T 2207/10048* (2013.01); *G06T 2207/20076* (2013.01); *G06T 2207/30212* (2013.01); *G06T 2207/30232* (2013.01); *G06T 2207/30241* (2013.01)

(58) Field of Classification Search
CPC ........ A61B 2562/0242; A61B 2576/00; A61B 5/0013; A61B 5/0059; A61B 5/0075; A61B 5/40; A61B 5/486; A61B 5/7246; A61B 2562/0233; A61B 3/0025; A61B 3/085; A61B 3/102; A61B 3/113; A61B 3/117; A61B 5/0066; A61B 5/0073; A61B 3/0033; A61B 3/0041; A61B 3/0091; A61B 3/028; A61B 3/18; A01B 69/008; B23P 19/10; B25J 9/1697; F02F 2007/0063; G01B 11/00; G01B 11/272; G05B 19/401; G05B 2219/34033; G05B 2219/39393; G05B 2219/45064; G06T 2207/10016; G06T 2207/10048; G06T 15/20; G06T 17/05; G06T 2207/10032; G06T 2207/20076; G06T 2207/30181; G06T 2207/30212; G06T 7/33; G06T 7/73; G06T 2207/10152; G06T 5/50; G06T 2207/10012; G06T 2207/30244; G06T 3/4038; G06T 7/254; G06T 7/277; G06T 7/285; G06T 2207/10021; G06T 2207/10024; G06T 2207/10028; G06T 2207/30241; G06T 7/248; G06T 7/246; G06T 7/262; A63F 2300/1087; A63F 2300/1012; A63F 13/00; A63F 13/02; A63F 13/04; A63F 13/06; A63F 13/10; A63F 13/213; A63F 13/245; A63F 2300/1043; A63F 2300/1062; A63F 2300/1075; A63F 2300/1081; G06K 9/00476; G06K 9/46; G06K 9/52; G06K 9/6215; G06K 9/6298; G06K 9/00127; G06K 9/00369; B64G 1/66; G01H 9/002; G02B 27/48; G02B 27/646; G03B 2217/005; G03G 15/0409; G03G 2215/0412; G03G 15/04072; H04N 5/23258; H04N 19/136; H04N 21/252; H04N 21/42201; H04N 21/44222; H04N 21/4532; H04N 5/23254; G01N 15/1468; G06F 3/00; G06F 3/0482; G06F 9/4446; G06N 99/00; G06N 99/005; G06Q 30/0261; H04L 67/306; G01S 17/023; G01S 17/66; G01S 3/7865; G01S 7/4802; G01S 7/499; G01S 7/51; G01S 7/497; G01C 15/002; C12M 35/08; C12M 41/46; C12M 41/48
USPC ... 348/36, 42, 169, 170, 171, 172, 155, 208; 382/103, 113, 154, 203, 284
See application file for complete search history.

(56) References Cited

U.S. PATENT DOCUMENTS

| | | | | |
|---|---|---|---|---|
| 5,506,682 | A * | 4/1996 | Pryor | A01B 69/008 356/400 |
| 5,923,776 | A * | 7/1999 | Kamgar-Parsi | G06K 9/38 382/173 |
| 6,201,236 | B1 * | 3/2001 | Juds | G01S 17/936 180/274 |
| 8,395,665 | B2 * | 3/2013 | Otani | G01C 15/002 348/169 |
| 8,958,654 | B1 * | 2/2015 | Evans | G06T 5/20 356/5.01 |
| 9,778,351 | B1 * | 10/2017 | Khosla | G01S 13/867 |
| 2006/0132753 | A1 * | 6/2006 | Nichols | G01S 13/865 356/5.07 |
| 2006/0239537 | A1 * | 10/2006 | Shragai | G06K 9/0063 382/154 |
| 2006/0245500 | A1 * | 11/2006 | Yonovitz | G01S 3/7865 375/240.19 |
| 2009/0245653 | A1 * | 10/2009 | Kochi | G06T 3/4038 382/203 |
| 2011/0299034 | A1 * | 12/2011 | Walsh | A61B 3/102 351/206 |
| 2011/0299734 | A1 * | 12/2011 | Bodenmueller | G06K 9/00993 382/103 |
| 2012/0076402 | A1 * | 3/2012 | Smith | G06K 9/4652 382/165 |
| 2015/0371431 | A1 * | 12/2015 | Korb | G06T 9/00 382/113 |
| 2016/0350938 | A1 * | 12/2016 | Maltese | G06T 7/208 |

OTHER PUBLICATIONS

Maltese, D., and Hamrouni, A., "Naval Asymmetric Threats and Piracy Acts: Study of a New IR Detection Module," Information Fusion (FUSION), 15th International Conference, IEEE, pp. 17-23, Jul. 9, 2012.

Panta, K., et al., "An Efficient Track Management Scheme for the Gaussian-Mixture Probability Hypothesis Density Tracker," Intelligent Sensing and Information Processing, Fourth International Conference, IEEE, pp. 230-235, Dec. 6, 2006.

Petetin, Y., et al., "A Tracker Based on a CPHD Filter Approach for Infrared Applications," Signal Processing, Sensor Fusion, and Target Recognition XX, Proceedings of SPIE, vol. 8050, pp. 1-12, May 13, 2011.

Wu, J., and Hu, S., "Probability-Hypothesis-Density Filter for Multitarget Visual Tracking With Trajectory Recognition," Optical Engineering, p. 129701, Jan. 1, 2010.

Zhang, H., et al., "Gaussian Mixture CPHD Filter With Gating Technique," Signal Processing, Elsevier Science, 89:8 1521-1530, Aug. 1, 2009.

International Search Report dated Mar. 27, 2015, issued in corresponding International Application No. PCT/EP2015/051244, filed Jan. 23, 2015, 3 pages.

Written Opinion of the International Searching Authority dated Mar. 27, 2015, issued in corresponding International Application No. PCT/EP2015/051244, filed Jan. 23, 2015, 8 pages.

* cited by examiner

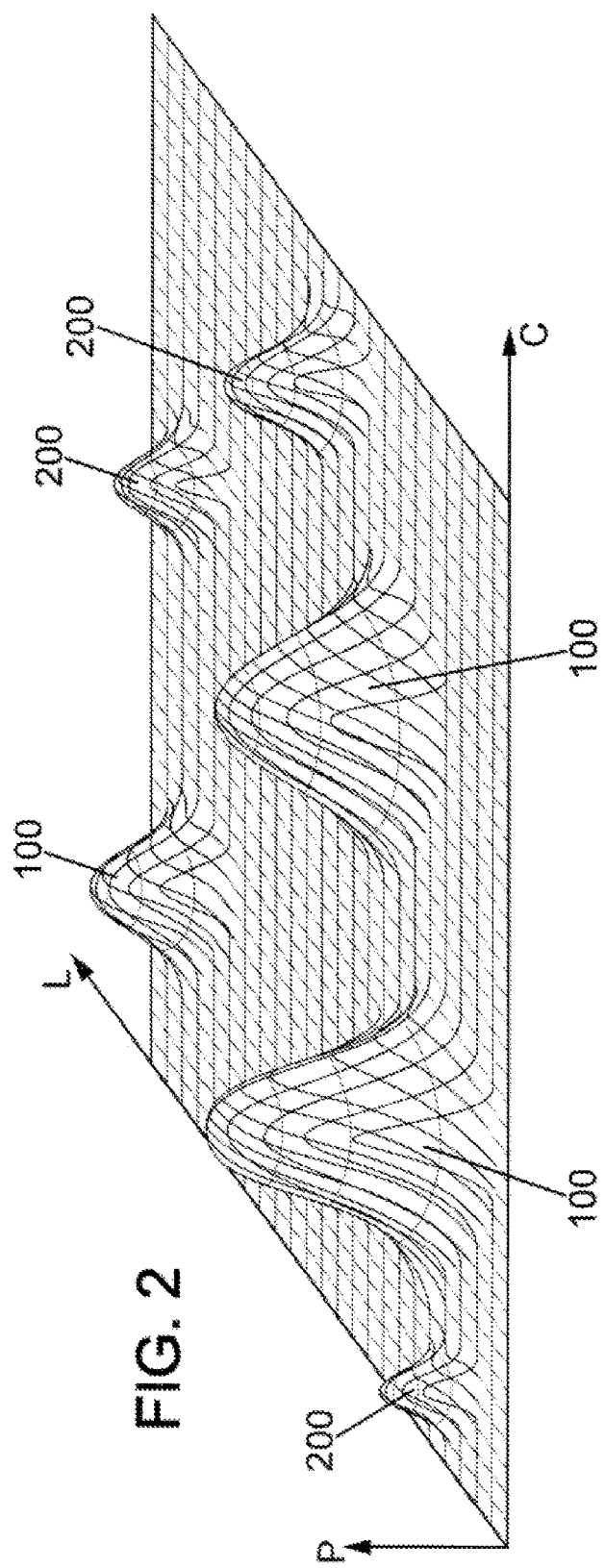

METHOD FOR DETECTING AND TRACKING TARGETS

The present invention concerns a method for detecting and tracking targets ("target search and track"), and a system for implementing such a method.

Target detection and tracking is a commonly used approach for the surveillance of an environment, particularly in the naval sector. It consists of successively capturing a series of electro-optical images of the environment, then checking each image for the potential presence of targets and confirming or ruling out such a presence by determining whether repeated detections exist for several successive images.

Such an approach to surveillance is often implemented using images of the environment that are captured in an infrared spectral band. In this case, the detection and tracking system is usually designated by IRST, for "InfraRed Search and Track". In addition, surveillance of the environment may be panoramic. For this, the environment can be scanned while continuously varying the line of sight multidirectionally over 360° (degrees). Each scan produces a new image which is also called a strip.

The following terms are used in the technical field of target detection and tracking:

spot, or hot spot: location within an image where the intensities captured for at least some pixels at that location have characteristics that are different from the environment in the image. In particular, the pixel intensities of a spot may be greater than those of nearby pixels. A spot may correspond to a target which is actually present in the field of observation or to a detection aberration. A spot is detected by applying a detection criterion, which may be determined in relation to an average signal level and/or to a noise level in the image. For example, the detection criterion may require that the intensity value at a point of the image, from which one can subtract the intensity value of the image background at and around that point, is greater than a predetermined detection threshold. More generally, the detection may be based on the value of a signal-to-noise ratio at the location in the image where the detection of a spot is being tested;

detection probability: probability that a target actually present in the field of surveillance is detected in an image as a spot;

false alarm probability: probability that a spot detected in an image is a detection aberration, meaning that this spot does not correspond to a target actually present in the field of surveillance. Such a false alarm spot is tracked in the surveillance method, the same as any spot that is detected;

track formation sequence: algorithm for tracking a target in the form of a spatiotemporal chain of spots detected in several successive images, leading either to a declaration that the chain of spots corresponds to an actual target, or to a decision that the chain of spots is considered to be a detection aberration;

track detection probability: probability that an actual target is detected and declared at the end of the track formation sequence; and false track probability: probability that a spatiotemporal chain of detected spots is incorrectly declared as a target at the end of the track formation sequence.

In a method for detecting and tracking targets, it is known to link together the two phases of the method in the following manner: the first phase consists of the detection of spots in each image, and then the track formation phase, or tracking, is performed iteratively for each spot that has been detected.

The spot detection phase itself comprises the following two steps:

/1/ using a detection threshold, searching for pixels within the image which each have a signal-to-noise ratio value that is greater than the detection threshold; and /2/ within a matrix of the image, grouping some of the pixels having signal-to-noise ratio values that exceed the detection threshold, when said pixels are close to one another within the image, so as to form grouped spots. It is possible to eliminate other pixels whose signal-to-noise ratio values also exceed the detection threshold if these other pixels are isolated in the image.

Such a detection phase is performed in an image processing module, for each image individually. It constitutes a spatial filtering of the image content which is applied separately from the other images.

The tracking phase determines whether each detected spot can be spatially chained to other spots present in the successive images previously captured. To do this, the track formation sequence is tested for all spots identified in the image that is being processed, or a reduced selection of certain spots. When a spot has been detected in the image currently being processed but cannot be correlated with one or more spots detected in images in the series that precede the image being processed, a track formation sequence is initiated for this new spot. If a spot that is detected in the image currently being processed can be attached to a track already identified from images of the series that precede the image being processed, tracking continues with the track formation sequence already initiated. Such an attachment is made while taking into account possible target movement between the image currently being processed and the previous image. A target track is then declared for a spatiotemporal chain of spots if the track formation sequence is completely satisfied for this chain of spots.

The algorithm for tracking a spot may consist of a series of detection ratios for the spot in successive images, called the track formation sequence. Such an algorithm is assumed to be known to those skilled in the art and is described for example in patent WO 02/21152. A detection ratio is M/N, where M and N are two positive and non-zero integers, and M is less than or equal to N. The detection ratio indicates that the chain of spots is present in M among N successive images. The detection ratio is satisfied if the chain of spots is detected in at least M of N successive images. The track formation sequence is satisfied if all detection ratios for this sequence are satisfied. In this case, the track formation results in declaring the chain of spots as a target. If one of the detection ratios is not satisfied, the chain of spots is considered a detection aberration and is discarded.

In practice, the tracking algorithm is effective if the number of spots being tracked in parallel in successive images is not too high. A large number of spots being simultaneously tracked can require calculation times that are inconsistent with the time separating two sequentially captured images, or can require an amount of memory and computing power that are not available in the system being used for surveillance. In addition, a large number of spots may cause the appearance of spot trajectories that are close to one another or that intersect, resulting in uncertainty concerning the allocation of trajectory segments to one chain of spots or to another for the tracks of two different chains of spots. For these reasons, the tracking of detected spots is more effective when the number of spots is limited, in other words when there is a low probability of false alarms.

Usually, such a limitation to the number of spots that are detected is performed by raising the threshold used in the detection step. The probability of a false alarm is decreased, but such an increase of the detection threshold has the effect of reducing the sensitivity of the overall process. This reduces the maximum distance to a potential target for which detection is effective. This maximum distance is called the detection range in the jargon of the trade.

Another disadvantage of increasing the detection threshold is the risk of not detecting, in a newly processed image, a target that has already been detected one or more times in previous images. An accumulation of such detection omissions may lead to interrupting the track formation sequence for the chain of spots, consequently reducing the track detection probability.

Several methods are already known for reducing the false alarm probability without reducing the spot detection range.

A first method is called "track before detect". It consists of searching for confirmation, in several successive images, for at least some points having an intensity or a signal-to-noise ratio that is greater than the detection threshold, before considering them or not considering them as spots and initiating tracking for each of them. This method is very memory and computation intensive because it takes place during image processing, comparing individual pixel intensities between two successive images.

A second known method consists of filtering the detected spots based on individual attributes of each spot within the image in which it is first detected. For example, the number of adjacent pixels which together constitute the spot, the shape of the spot outline, or the morphology of the spot, and its radiometric intensity are attributes that can be taken into account when filtering. Tracking is then carried out only for those spots that were retained after applying such a filter.

The article entitled "On Track-Management Within the PMHT Framework" by Monika Wieneke and Peter Willett, FUSION 2008 ISIF Symposium, describes a third method for reducing the false alarm probability, as part of a detection and tracking method that is measurement-oriented. In such a method, Probabilistic Multiple Hypothesis Tracking (PMHT) can parallel-process several possible trajectories for a potential target while it is being tracked, based on the positions of spots identified in successive images. In such a detection and tracking method, the spots that are detected in a newly captured image are first assigned as much as possible to the trajectories already initiated based on previous images. Then the remaining spots, meaning those which have not been so assigned to an already identified hypothetical trajectory, are filtered before initiating a new track formation sequence for each of them. Such filtering is performed by an additional module of the target detection and tracking system, which is called the GM-PHD (Gaussian-Mixture Probability Density Hypothesis) Clutter Remover. Such a module constructs a probability density distribution within an image matrix, from a current state of track formation sequences and spot trajectories which result from images preceding the image currently being processed. Such a probability density distribution, which is also called an "intensity function" by the skilled person, is constructed by applying kinematic criteria concerning spot movement between different images, and updated for each new image that is captured and processed.

Thus, target detection and tracking methods are also known which further comprise the steps of:

/3/ selecting some of the spots formed in step /2/, more limited in number than the set of spots formed in said step /2/, and /4/ testing a track formation sequence for the selected spots only, and declaring a target track for a chain of spots selected in different images if the track formation sequence is completely satisfied for this chain of spots.

Compared to these known methods, a first object of the invention is to increase tracking efficiency relative to image capture frequency, without reducing the detection range.

A second object of the invention is to reduce the false alarm probability without reducing the track detection probability.

An additional object of the invention is to achieve these first and second aims without requiring too much additional memory and computing power.

Finally, another additional object of the invention is to use a detection and tracking method that is "track-oriented".

To achieve these and other aims, a first aspect of the invention provides a method for detecting and tracking targets in a series of electro-optic images of a same field of surveillance, comprising steps /1/ to /4/ which are carried out for each image, but wherein the number of spots that are selected in step /3/ is limited based on at least one statistical characteristic relating to the track formation sequences already being tested before this step /3/ is carried out for the image currently being processed.

This limits the actual number of tracks that are being followed in parallel at the same moment in the process, avoiding saturation of the tracking capacity. In addition, this limitation reduces the risk that the trajectories of the different chains of spots being tracked will intersect or be superimposed. This usually avoids situations where there is uncertainty, also known as ambiguity to the skilled person, in the allocation of trajectory segments to the chains of spots concerned.

In addition, the false alarm probability is reduced without the need to increase the detection threshold for spots within each image. The detection range within the field of surveillance is therefore not reduced. Similarly, not increasing the detection threshold reduces the risk that a spot corresponding to an already initiated chain does not appear in a later image, leaving a hole in the detection or even ending the tracking, when this current chain of spots corresponds to an actual target that has continuously remained in the field of surveillance. The track detection probability is thus maintained or improved by the invention.

Such a method according to the invention can be "track oriented", because a newly detected spot does not negate a track already in progress with its associated potential target trajectory.

In preferred implementations of the invention, the number of spots which are selected in step /3/ may be limited based on an integrated intensity value $N_c$ that is calculated for a target presence probability density distribution produced for the track formation sequences already being tested before step /3/ is executed for the image currently being processed, and based on a number of spots $N_t$ for which the track formation sequences are already being tested, and which have individual weights exceeding a predetermined weight threshold. In other words, the statistical characteristic relating to track formation sequences already being tested before step /3/ is executed for the image currently being processed and that is used to select the spots during execution of step /3/ for the image currently being processed, comprises the integrated intensity value $N_c$ and the number of spots $N_t$.

These two components of the statistical characteristic are easily available, without requiring significant additional calculations.

For some of these preferred implementations of the invention, the weight threshold used for the individual weight of each spot for which the track formation sequence is being tested, in order to determine the number of spots Nt, may be equal to 0.5.

Preferably, the number of spots selected in step /3/ may be between the number of spots Nt and the integrated intensity value Nc plus a predetermined margin Mf, or may be equal to the number of spots Nt or to the integrated intensity value Nc plus the margin Mf.

Even more preferably, the number of spots selected in step /3/ may be equal to the smallest among the number of spots Nt and the integrated intensity value Nc plus the margin Mf.

In these preferred implementations of the invention which use the margin Mf, this margin may be a non-zero integer that is typically less than or equal to five.

The method of the invention may further comprise the following steps:
producing the target presence probability density distribution from a current state of the track formation sequences initiated for images preceding the image currently being processed, and from the trajectories of the spots corresponding to these track formation sequences initiated for preceding images, by applying kinematic criteria concerning spot movement between successive images;
searching for a correlation between the target presence probability density distribution and the spots that were formed in step /2/; then
updating the target presence probability density distribution by using a result of the correlation.

The statistical characteristic relating to the track formation sequences already being tested when step /3/ is carried out for the image currently being processed, and which is used to limit the number of spots selected in said step /3/, may advantageously be obtained from the updated target presence probability density distribution. Thus, a track formation sequence that has ended can be taken directly into account to initiate a new track formation sequence based on another spot selected in the image currently being processed.

In particular implementations of the invention, each spot may have a Gaussian profile within the target presence probability density distribution.

Finally, in general, the spots selected in step /3/ may correspond to track formation sequences which are already being tested, or may have weight values greater than the weight values of the spots not selected, or may have respective signal-to-noise ratio values that exceed a selection threshold, or may each comprise a number of pixels that is greater than a minimum spot size, or may satisfy criteria related to an assumed target type.

A second aspect of the invention provides a system for detecting and tracking targets, which comprises the following components:
a device for capturing electro-optical images;
an image processing module adapted to calculate respective signal-to-noise ratio values for the pixels of each captured image, to group certain pixels having signal-to-noise ratio values that exceed a detection threshold, when these pixels are close to one another in the captured image, so as to form grouped spots, and possibly also to eliminate other pixels whose signal-to-noise ratio values also exceed the detection threshold, if these other pixels are isolated in the image;
a tracking module, adapted to test a track formation sequence for at least some of the spots by using a chain of spots detected in different images, and to declare a target track for the chain of spots if the track formation sequence is satisfied for this chain of spots; and
a spot selection module, arranged to receive as input, for each captured image, the spots formed by the image processing module, and to output some of the spots received as input, and arranged so that the tracking module tests the track formation sequence only for those spots which are output by the selection module.

The system of the invention is characterized in that the selection module is adapted to select the spots that are output, while limiting the number of these output spots based on at least one statistical characteristic relating to the track formation sequences that were already being tested before the spots are selected for the image currently being processed.

Such a system is adapted for carrying out a method according to the first aspect of the invention, including its preferred implementations which have been cited.

In particular, the system may further comprise a hypothetical probability density filter which is adapted to produce the target presence probability density distribution based on a current state of the track formation sequences established by the tracking module, and based on the spot trajectories corresponding to these track formation sequences, by applying kinematic criteria concerning spot movement between successive images, and is adapted to search for a correlation between the target presence probability density distribution and the spots that have been formed by the image processing module, and then to update the target presence probability density distribution using a result of the correlation. In this case, the hypothetical probability density filter may incorporate the spot selection module.

In particular, the hypothetical probability density filter may be adapted so that it itself calculates, from the updated target presence probability density distribution, the integrated intensity value Nc and the number of spots Nt for which the track formation sequences are currently being tested, and which have individual weights higher than the weight threshold.

In preferred embodiments of the invention, the hypothetical probability density filter may concern a combination of Gaussian profiles.

Other features and advantages of the invention will be apparent from the following description of some non-limiting exemplary implementations, with reference to the accompanying drawings in which:

FIG. 1 shows the main components of a system for detecting and tracking targets according to the invention; and FIG. 2 symbolically illustrates a target presence probability density distribution as may be used in a method according to the invention.

For illustrative purposes, the invention is now described for a surveillance system operating in the infrared spectral range. In this case, and with reference to FIG. 1, the system may be an IRST system and comprise the image capturing device 10 with processing and analysis modules 11 to 13. It may also include additional components, such as memories for storing images and controllers for such memories, but the use of such additional components in a target detection and tracking system is assumed to be known and is not described again here.

The device 10 may be mounted on a turret rotating about a vertical axis, and controlled so that it rotates continuously at a constant speed. In this manner, with each rotation an image can be captured which represents the environment around the system between a minimum height and a maximum height at the site. Each shot captured during a complete rotation constitutes a new image, such that a series of successive images is captured during continuous rotation of the turret. The image acquisition rate may be between 0.1 and 1 Hz (Hertz), for example. Other alternative modes of image capture, for example using a device 10 which is stationary, may alternatively be used. The image capture frequency can then be higher, in particular greater than 10 Hz.

Each image that is captured by the device 10 is sent to an image processing module 11. The function of this module 11 is to extract the spots from each image, independently of the other previously captured images, and to send the coordinates and possibly a signal-to-noise ratio for each spot to a hypothetical probability density filter 12.

Conventionally, the image processing module 11 comprises at least two distinct units that are respectively denoted 1 and 2. Unit 1 is dedicated to calculating a value for the signal-to-noise ratio, abbreviated as S/N, individually for at least some of the constituent pixels of a new image captured by the device 10. Preferably, the S/N ratio is calculated for each pixel of a captured image. It can be calculated in one of the ways known to the skilled person, for example by using a global evaluation of the noise over the entire image, or using a local evaluation of image noise around each pixel, and possibly subtracting an image background intensity level. There are several prior art methods for evaluation and enhancement known before the invention that can be used to calculate the S/N ratio. Unit 1 also receives a detection threshold, which is compared to the value of the S/N ratio of each pixel. The detection threshold may be absolute or defined as a relative value compared to a maximum value reached in the image for the S/N ratio. Unit 1 then sends to unit 2 the coordinates for the pixels where the S/N ratio values are above the detection threshold, and possibly the S/N ratio values themselves.

Unit 2 proceeds with grouping the pixels sent by unit 1, according to their proximity within the image. Pixels where the S/N ratio value is greater than the detection threshold, and which are neighboring or close to one another in the image, are collected into a grouped spot, simply referred to as a spot in the rest of this description. Each spot is identified and associated with its coordinates in the image, and possibly also with a general S/N ratio value which is defined for this spot. Spot formation algorithms, which may be applied in unit 2, are also well known to the skilled person and it is not necessary to describe them again here. Optionally, such algorithms may simultaneously eliminate the pixels for which the individual values of the S/N ratio are above the detection threshold but are isolated in the image. Such isolated pixels may also include small groups of neighboring pixels having individual S/N ratio values that are above the detection threshold, but which would form grouped spots whose general S/N ratio value for each of these small groups would be too low. The image processing module 11 then sends to module 12 the identification and coordinates of the spots and possibly the S/N ratio values that were determined for each spot. Each spot outputted by the image processing module 11 may also be associated with a weight that is a combination of a spatial extension of the spot in the image and a contrast of this spot. In other words, module 11 applies spatial filtering to the content of each image captured by the device 10, and the image areas of greater filtered intensity form the spots which are delivered to module 12.

Module 12 may be a PHD ("Probabilistic Hypothesis Density") filter module, and module 13 is dedicated to tracking targets in multiple images captured in succession. The tracking principle may be one of those known prior to the invention and described above. Modules 12 and 13 work together to allocate some of the spots, delivered by module 11 for a new image, as the continuation of trajectories in the matrix of images that result from spots detected in previous images. These trajectories are therefore formed of spatiotemporal chains of plots detected in different images. To extend a chain that was already initiated, module 12 comprises a prediction unit 3 and an updating unit 4. The prediction unit 3 constructs a target presence probability density distribution from track formation sequences that have been initiated or confirmed for preceding images still being tested or maintained, and coordinates in the image matrix of the spots involved in these sequences. This probability density distribution is commonly called the intensity function, and it assigns to each point of the image field, or to each pixel of the image matrix, a probability density value indicating the probability that a target is actually present at that location. For this purpose, spots that have been detected in multiple images are assigned to the same trajectory in accordance with a trajectory continuity constraint between successive images. The trajectory is then extrapolated for the moment of capture of the image currently being processed, meaning the last image for which module 11 has provided the detected spots. This extrapolation may also take into account kinematic constraints concerning an assumed target type, such as maximum movement speed for example. In addition, each spot in the probability density distribution has an individual weight whose value is higher when the track formation sequence is already being followed over a large number of images, or when the S/N ratio values are high for the spots of this formation sequence in the successive images, or when these S/N ratio values are changing steadily, etc. Various methods or combinations of methods for assigning a weight to each spot in the probability density distribution are also assumed to be known.

Module 4 is dedicated to updating the probability density distribution as provided by the prediction unit 3. For this purpose, of the spots sent by the image processing module 11, those which are substantially superimposed over spots of the probability density distribution, or are close to such spots, are merged with those spots. The probability density distribution is thus modified, in other words updated, to reflect the information extracted from the image currently being processed. This updating concerns the position of each spot in the image matrix, its spread, and its weight. Algorithms that are suitable for implementing such updating are also known to the skilled person and are not part of the contribution of the present invention.

FIG. 2 symbolically represents a target presence probability density distribution, denoted P, as could be used in the invention. The distribution P may have values for all points of the matrix common to all images captured by the device 10. It may be defined by a sum of envelopes, each with an amplitude, one or two transverse dimensions, and coordinates of a center of this envelope within the image matrix. The envelopes may each have a predetermined shape, for example a Gaussian envelope. The parameters of each envelope are adjusted to coincide with a spot, and the amplitude of the envelope is determined by the weight of the spot. The 100 denotes spots having significant weights in the probability density distribution P, and the 200 denotes spots of lower weights. The coordinates of each spot in the image matrix are the column number denoted C and the row number denoted L, which correspond to the center of the spot. In the case of Gaussian envelopes, the filter 12 is said to be a GM-PHD (Gaussian-mixture probabilistic density hypothesis) filter.

To implement the invention, statistical characteristics may be calculated from the probability density distribution, possibly by the updating unit 4 itself. For example, these characteristics may include an integrated intensity value for the probability density distribution. "Integrated intensity value", denoted Nc, is understood to mean an integral summation of the individual values of the probability density distribution for all points of the image matrix. Nc corresponds to a number of different targets that are suspected as being in the field of surveillance, based on the current state of the track formation sequences.

Another statistical characteristic of the probability density distribution may be the number of spots in this distribution that have a weight greater than a predetermined weight threshold. Such a weight threshold may be defined as a fixed value or as a relative value, such as for example a fraction of the maximum spot weight that is reached in the probability density distribution, or a fraction of the average weight of the spots that are present in the distribution. For example, the weight threshold may be set to 0.5, or 0.4, or 0.25.

The invention aims to limit the number of track formation sequences pursued simultaneously and in parallel by the tracking module 13. In other words, it is desired that the module 13 function by compromising between the processing capacity of this module and the complexity of the probability density distribution for the series of images being analyzed. "Processing capacity" of the module 13 is understood to mean the number of track formation sequences that can be followed in parallel over a specified period of analysis of each image. For this, the filter 12 makes a selection among the spots sent by the image processing module 11 for the image currently being processed. This selection may be made by a dedicated module, denoted 5. The spot selection is limited by the number of spots that will actually be sent to the tracking module 13. Unsent spots may be permanently discarded or may be stored temporarily. In a preferred but non-limiting implementation of the invention, this number of spots sent to the tracking module 13 may be equal to the smaller among the following two values:

the integrated intensity value Nc of the probability density function, increased by a margin Mf: Nc+Mf; and the number Nt of spots that have individual weights exceeding the predefined weight threshold, in the updated probability density function.

For example, the margin Mf may be a non-zero integer less than or equal to ten, preferably less than or equal to five, for example equal to two or three. The value that is chosen for the margin Mf controls the average number of new track formation sequences that can be initiated with each new image that is analyzed, or the average frequency at which such new track formation sequences are initiated, in relation to the number of analyzed images.

Thus, for a probability density distribution of low complexity, comprising few spots but each of them being large, the number of spots of the image currently being processed that are selected to be sent to the tracking module 13 is Nt. These selected spots of the image currently being processed may include some that coincide with the spots of the updated probability density function, but not necessarily all. New spots may thus be selected according to the number of detection holes that have been introduced into the track formation sequences currently being tested, or the number of such sequences which may possibly be ending. A new track formation sequence is then initiated for each of these new spots. In practice, this situation with its probability density distribution of low complexity is the most frequent.

When the probability density distribution becomes more complex, it contains significant spots, meaning spots where the individual weights each exceed the predetermined weight threshold, in larger numbers. The number of spots selected by module 5 to be sent to the tracking module 13 then increases until it is limited by Nc+Mf. This avoids functionally overloading the tracking module 13. Again in this case, some of the selected spots may not correspond to any track formation sequences already being tested.

The spots which are sent by module 5 to module 13, in a number that is limited in the manner just described, can be selected in several ways, based on criteria used for this selection. Priority is not necessarily given to spots for which track formation sequences are already being tested. Possible selection criteria for the spots that are sent to the tracking unit 13 may be: spots are selected in descending order of their respective weight values, or spots having a S/N ratio value greater than a predetermined selection threshold, or spots that meet one or more criteria related to an assumed target type. It is possible and may be advantageous to use a combination of several of these criteria in module 5 to select the spots that are sent to the tracking module 13. Criteria related to the target type may concern the morphology of the targets, their apparent movement speeds, etc.

The spot selection carried out in this manner by module 5 reduces the clutter present in the processed image. The tracking module 13 then continues with the track formation sequences that are already underway, and possibly initiates new track formation sequences for only those spots that have been selected. The testing and updating of each sequence by module 13 are known per se and are not modified by the invention. The declared tracks can then be presented to a surveillance operator, who confirms or rejects the detection of an actual target.

The following table compares the surveillance performance of a target detection and tracking system without the selection module 5, and another system which incorporates such a selection module 5 used according to the invention. Two values for the detection threshold, respectively indicated as the average threshold and lower threshold, are used for the system without selection module, while the system according to the invention is implemented with only the lower threshold. The same scenario, where an aircraft appears in the field of surveillance starting from an edge of the field of surveillance then moving further away into a cloudy sky while remaining within the field of surveillance, is used for the three experiments.

|  | Without selection module- Average threshold | Without selection module- Lower threshold | With selection module- Lower threshold |
| --- | --- | --- | --- |
| Positive detections of aircraft | Images 794 to 1285 then 1385 to 1415 | Images 794 to 1068 then 1310 to 1461 | Images 794 to 1461 |
| Number of false tracks per image |  | Mean = 1.81 Standard deviation = 2.07 | Mean = 0.497 Standard deviation = 0.696 |
| Number of false tracks created per image |  | Mean = 0.046 Standard deviation = 0.225 | Mean = 0.013 Standard deviation = 0.117 |
| Number of false tracks for clouds per image | Mean = 0.212 Standard deviation = 0.409 |  | Mean = 0.995 Standard deviation = 0.136 |
| Number of false tracks for clouds created per image | Mean = 0.009 Standard deviation = 0.096 |  | Mean = 0.005 Standard deviation = 0.073 |

The number of false tracks is therefore greatly reduced by the use of the selection module 5 according to the invention.

Furthermore, the fact that the aircraft continues to be tracked until image 1461 for the last two columns of the table, instead of stopping at image 1415, shows that the aircraft tracking is maintained and continued. Moreover, the positive detections of the aircraft show that the reduction of the detection threshold has not introduced erroneous detections.

For the cloud edges, the clouds are detected and tracked for 99.5% of the surveillance time when the selection module 5 is used according to the invention, while they are detected and tracked for only 21.2% of the surveillance time for the average detection threshold without using the selection module 5. Increasing the number of images in which cloud edges are detected and tracked gives the operator sufficient time to easily identify the targets concerned as being cloud edges. Moreover, as they are stable over time, once identified these targets are no longer disruptive to the operator.

Through the use of the selection module 5 according to the invention, it was therefore possible to lower the detection threshold, in other words to increase the sensitivity for detecting a potential target within each captured image, without reducing the tracking probability. Specifically, lowering the detection threshold allows following a target such as the aircraft in the above example for a longer period of time. This also allows eliminating certain false tracks while having improved continuity for the detection of an actual target in the successive images.

It is understood that the invention can be reproduced while introducing changes to the implementation described above. In particular, the statistical characteristic of the track formation sequences which are already being tested when processing a new image, and which is used to limit the number of spots selected in this new image, may be different from the integrated intensity value Nc and the number of significant spots Nt. In addition, even when this value Nc and this number Nt are used, a combination other than choosing between the smallest among the number Nt and the sum of Nc and the margin Mf may be applied for limiting the number of spots selected for sending to the tracking module.

The invention claimed is:

1. A method for detecting and tracking targets in a series of electro-optical images of a same field of surveillance, comprising the following steps carried out for each image during processing:

/1/ using a detection threshold, searching for pixels in the image which each have a signal-to-noise ratio value that exceeds the detection threshold;

/2/ within a matrix of the image, grouping some of the pixels having signal-to-noise ratio values that exceed the detection threshold, when said pixels are close to one another within the image, so as to form a set of grouped spots;

/3/ selecting some of the spots formed in step /2/, more limited in number than the set of spots formed in said step /2/, and /4/ testing a track formation sequence for the selected spots only, and declaring a target track for a chain of spots that are selected in different images if the track formation sequence is completely satisfied for said chain of spots;

wherein the number of spots selected in step /3/ is limited based on an integrated intensity value Nc calculated for a target presence probability density distribution, produced for the track formation sequences already being tested before step /3/ is executed for the image currently being processed, and based on a number of spots Nt of said distribution which have individual weights exceeding a predetermined weight threshold, wherein the spots selected in step /3/ correspond to the track formation sequences which are already being tested, or have weight values greater than the weight values of the spots not selected, or have respective signal-to-noise ratio values that exceed a selection threshold, or each comprise a number of pixels that is greater than a minimum spot size, or satisfy criteria related to an assumed target type, the integrated intensity value Nc being an integral summation of the individual values of the probability density distribution for all points of the matrix of the image, and the individual weight of each spot resulting from a combination of a spatial extension of the spot in the image and a contrast of this spot.

2. The method of claim 1, wherein the predetermined weight threshold used for the individual weight of each spot for which the track formation sequence is being tested, in order to determine the number of spots Nt, is equal to 0.5.

3. The method of claim 1, wherein the number of spots selected in step /3/ is between the number of spots Nt and the integrated intensity value Nc plus a predetermined margin Mf, or is equal to said number of spots Nt or to said integrated intensity value Nc plus the margin Mf.

4. The method of claim 3, wherein the number of spots selected in step /3/ is equal to the smallest among the number of spots Nt and the integrated intensity value Nc plus the margin Mf.

5. The method of claim 3, wherein the margin Mf is a non-zero integer less than or equal to five.

6. The method of claim 1, further comprising:

producing the target presence probability density distribution from a current state of the track formation sequences initiated for images preceding the image currently being processed, and from the trajectories of spots corresponding to these track formation sequences initiated for the images preceding the image currently being processed, by applying kinematic criteria concerning spot movement between successive images;

searching for a correlation between the target presence probability density distribution and the spots formed in step /2/; then updating the target presence probability density distribution by using a result of the correlation, and wherein the statistical characteristic relating to the track formation sequences already being tested when step /3/ is carried out for the image currently being processed, wherein the statistical characteristic is used to limit the number of spots selected in said step /3/, and wherein the statistical characteristic is obtained from the updated target presence probability density distribution.

7. The method of claim 1, wherein each spot has a Gaussian profile within the target presence probability density distribution.

8. A system for the detection and tracking of targets, comprising:

a device for capturing electro-optical images;

an image processing module adapted to calculate respective signal-to-noise ratio values for the pixels of each captured image, in order to group certain pixels having signal-to-noise ratio values that exceed a detection threshold, when said pixels are close to one another in the captured image, so as to form grouped spots;

a tracking module, adapted to test a track formation sequence for at least some of the spots by using a chain of spots that are detected in different images, and to declare a target track for the chain of spots if the track formation sequence is satisfied for this chain of spots; and a spot selection module, arranged to receive as input, for each captured image, the spots formed by the image processing module, and to output some of the spots received as input, wherein the tracking module tests the track formation sequence only for those spots which are output by said selection module, wherein the spots which are output by said selection module correspond to track formation sequences which are already being tested, or have weight values greater than the weight values of the spots not selected, or have respective signal-to-noise ratio values that exceed a selection threshold, or each comprise a number of pixels that is greater than a minimum spot size, or satisfy criteria related to an assumed target type, wherein the spot selection module is adapted to select the spots that are output, while limiting the number of said output spots based on an integrated intensity value Nc calculated for a target presence probability density distribution, produced for track formation sequences that were already being tested before a selection is made for an image currently being processed, and based on a number of spots Nt of said distribution which have individual weights that exceed a predetermined weight threshold, the integrated intensity value being an integral summation of the individual values of the probability density distribution for all points of a matrix of the image, and the individual weight of each spot resulting from a combination of a spatial extension of the spot in the image and a contrast of said spot.

9. The system of claim 8, adapted to carry out a method comprising the following steps:

/1/ using the detection threshold, searching for pixels in the image which each have a signal-to-noise ratio value that exceeds the detection threshold;

/2/ within the matrix of the image, grouping some of the pixels having signal-to-noise ratio values that exceed the detection threshold, when said pixels are close to one another within the image, so as to form grouped spots;

/3/ selecting some of the spots formed in step /2/, more limited in number than the set of spots formed in said step /2/, and /4/ testing a track formation sequence for the selected spots only, and declaring a target track for a chain of spots that are selected in different images if the track formation sequence is completely satisfied for said chain of spots;

wherein the number of spots selected in step /3/ is limited based on an integrated intensity value Nc calculated for a target presence probability density distribution, produced for the track formation sequences already being tested before step /3/ is executed for the image currently being processed, and based on the number of spots Nt of said distribution which have individual weights exceeding the predetermined weight threshold.

10. The system of claim 9, further comprising:

a hypothetical probability density filter adapted to produce the target presence probability density distribution from a current state of track formation sequences that is established by the tracking module, and from spot trajectories corresponding to said track formation sequences, by applying kinematic criteria concerning spot movement between successive images, and adapted to search for a correlation between the target presence probability density distribution and the spots that have been formed by the image processing module, followed by updating the target presence probability density distribution by using a result of the correlation; and the hypothetical probability density filter incorporating the spot selection module.

11. The system of claim 10, wherein the hypothetical probability density filter is adapted to calculate, from the updated target presence probability density distribution, the integrated intensity value Nc and the number of spots Nt for which the track formation sequences are currently being tested, and which have individual weights exceeding the weight threshold.

12. The system of claim 10, wherein the hypothetical probability density filter is at least in part based on a combination of Gaussian profiles.

* * * * *